United States Patent
Herrington et al.

(10) Patent No.: US 7,244,357 B2
(45) Date of Patent: *Jul. 17, 2007

(54) PUMPS FOR FILTRATION SYSTEMS

(75) Inventors: Rodney E. Herrington, Albuquerque, NM (US); Frank R. Hand, Albuquerque, NM (US)

(73) Assignee: MIOX Corporation, Albuquerque, NM (US)

( * ) Notice: Subject to any disclaimer, the term of this patent is extended or adjusted under 35 U.S.C. 154(b) by 276 days.

This patent is subject to a terminal disclaimer.

(21) Appl. No.: 10/759,750

(22) Filed: Jan. 16, 2004

(65) Prior Publication Data

US 2004/0173528 A1    Sep. 9, 2004

Related U.S. Application Data (63) Continuation-in-part of application No. PCT/US02/22618, filed on Jul. 16, 2002, and a continuation-in-part of application No. 09/907,092, filed on Jul. 16, 2001, now Pat. No. 6,736,966, which is a continuation-in-part of application No. 09/318,468, filed on May 25, 1999, now Pat. No. 6,261,464, and a continuation-in-part of application No. 09/514,431, filed on Feb. 28, 2000, now abandoned, which is a continuation-in-part of application No. 09/318,469, filed on May 25, 1999, now abandoned, said application No. 09/907,092 is a continuation-in-part of application No. 09/579,178, filed on May 24, 2000, now Pat. No. 6,524,475, and a continuation-in-part of application No. PCT/US00/14513, filed on May 25, 2000, and a continuation-in-part of application No. 09/686,214, filed on Oct. 10, 2000, now Pat. No. 6,558,537, which is a continuation-in-part of application No. 10/382,971, filed on Mar. 5, 2003, which is a continuation of application No. PCT/US00/33254, filed on Dec. 8, 2000.

(60) Provisional application No. 60/446,830, filed on Feb. 11, 2003, provisional application No. 60/305,912, filed on Jul. 16, 2001, provisional application No. 60/266,659, filed on Feb. 5, 2001, provisional application No. 60/230,895, filed on Sep. 5, 2000.

(51) Int. Cl.
  *B01D 63/00*  (2006.01)
  *B01D 63/10*  (2006.01)
  *B01D 61/06*  (2006.01)
  *B01D 61/00*  (2006.01)

(52) U.S. Cl. .............. 210/321.66; 210/650; 210/652; 210/97; 210/101; 210/321.65; 210/321.76; 210/321.85; 417/323; 417/264; 417/404

(58) Field of Classification Search .............. None
See application file for complete search history.

(56) References Cited

U.S. PATENT DOCUMENTS

| | | | |
|---|---|---|---|
| 1,029,580 A | 6/1912 | Bane | |
| 1,160,528 A | 11/1915 | Pilkington | |
| 1,200,165 A | 10/1916 | Burgess | |
| 2,473,986 A | 6/1949 | Booth | 210/185 |
| 3,222,269 A | 12/1965 | Stanton | 204/270 |
| 3,365,061 A | 1/1968 | Bray | 210/130 |
| 3,505,215 A | 4/1970 | Bray | 210/22 |
| 3,558,242 A | 1/1971 | Jenkyn-Thomas | |
| 3,622,479 A | 11/1971 | Schneider | 204/149 |
| 3,654,148 A | 4/1972 | Bradley | 210/23 |
| 3,749,524 A | 7/1973 | Jordan | 417/323 |
| 3,791,768 A | 2/1974 | Wanner | 417/393 |
| 3,825,122 A | 7/1974 | Taylor | 210/134 |
| 4,000,065 A | 12/1976 | Ladha et al. | 210/23 |
| 4,070,280 A | 1/1978 | Bray | |
| 4,077,883 A | 3/1978 | Bray | 210/136 |
| 4,124,488 A | 11/1978 | Wilson | 210/134 |
| 4,151,092 A | 4/1979 | Grimm et al. | 210/256 |
| 4,187,173 A | 2/1980 | Keefer | 210/23 |
| 4,219,424 A | 8/1980 | Tamura et al. | 210/201 |
| 4,288,326 A | 9/1981 | Keefer | 210/637 |
| 4,290,873 A | 9/1981 | Weaver | 204/228 |
| 4,306,952 A | 12/1981 | Jansen | 204/149 |
| 4,321,137 A | 3/1982 | Kohler | 210/137 |
| 4,367,140 A | 1/1983 | Wilson | 210/110 |
| 4,389,311 A | 6/1983 | La Freniere | 210/198 |

DUAL DIAPHRAGM PUMP DRIVEN MEMBRANE SYSTEM

| | | | | | | | |
|---|---|---|---|---|---|---|---|
| 4,432,876 A | 2/1984 | Keefer | 210/652 | 6,197,189 B1 | 3/2001 | Schwartz et al. | 210/192 |
| 4,434,056 A | 2/1984 | Keefer | 210/637 | 6,203,696 B1 | 3/2001 | Pearson | 210/98 |
| 4,496,443 A | 1/1985 | Mack et al. | 204/130 | 6,524,475 B1 | 2/2003 | Herrington et al. | 210/192 |
| 4,534,713 A | 8/1985 | Wanner | 417/377 | 6,558,537 B1 | 5/2003 | Herrington et al. | 210/192 |
| 4,560,455 A | 12/1985 | Porta et al. | 204/130 | 6,609,070 B1 | 8/2003 | Lueck | |
| RE32,144 E | 5/1986 | Keefer | 210/637 | 6,736,966 B2 | 5/2004 | Herrington et al. | 210/192 |
| 4,632,754 A | 12/1986 | Wood | 210/257.2 | 6,841,076 B1 | 1/2005 | Wobben | |
| 4,722,263 A | 2/1988 | Valentin | 92/13.7 | | | | |
| 4,724,079 A | 2/1988 | Sale et al. | 210/638 | | | | |
| 4,744,877 A | 5/1988 | Maddock | 204/266 | | | | |
| 4,756,830 A | 7/1988 | Fredkin | 210/321.66 | | | | |
| 4,759,844 A | 7/1988 | Lipschultz et al. | 210/257.2 | | | | |
| 4,761,208 A | 8/1988 | Gram et al. | 204/95 | | | | |
| 4,765,807 A | 8/1988 | Henriksen | 55/51 | | | | |
| 4,786,380 A | 11/1988 | van Duin et al. | 204/95 | | | | |
| 4,790,923 A | 12/1988 | Stillman | 204/268 | | | | |
| 4,790,946 A | 12/1988 | Jansen | 210/748 | | | | |
| 4,836,924 A | 6/1989 | Solomon | 210/321.87 | | | | |
| 4,861,487 A | 8/1989 | Fulk, Jr. | | | | | |
| RE33,135 E | 12/1989 | Wanner, Sr. et al. | 417/377 | | | | |
| 4,929,347 A * | 5/1990 | Imai et al. | 210/101 | | | | |
| 4,973,408 A | 11/1990 | Keefer | 210/652 | | | | |
| 4,976,842 A | 12/1990 | Fowler | | | | | |
| 5,006,352 A | 4/1991 | Zelenak nee Zoltai et al. | 426/67 | | | | |
| 5,085,753 A | 2/1992 | Sherman | 204/267 | | | | |
| 5,207,916 A | 5/1993 | Goheen et al. | 210/637 | | | | |
| 5,244,579 A | 9/1993 | Horner et al. | 210/652 | | | | |
| 5,295,519 A | 3/1994 | Baker et al. | 141/18 | | | | |
| 5,306,428 A | 4/1994 | Tonner | 210/652 | | | | |
| 5,320,718 A | 6/1994 | Molter et al. | 204/101 | | | | |
| 5,324,666 A | 6/1994 | Siepmann et al. | 436/62 | | | | |
| 5,358,635 A | 10/1994 | Frank et al. | | | | | |
| 5,480,386 A | 1/1996 | Brohy et al. | 604/131 | | | | |
| 5,492,534 A | 2/1996 | Athayde et al. | 604/141 | | | | |
| 5,496,466 A | 3/1996 | Gray | 210/137 | | | | |
| 5,503,736 A | 4/1996 | Schoenmeyr | 210/91 | | | | |
| 5,531,887 A | 7/1996 | Miers | 210/135 | | | | |
| 5,534,145 A | 7/1996 | Platter et al. | 210/90 | | | | |
| 5,540,355 A | 7/1996 | Hancock et al. | 222/56 | | | | |
| 5,540,848 A | 7/1996 | Engelhard | 210/748 | | | | |
| 5,558,762 A | 9/1996 | Fife et al. | 210/130 | | | | |
| 5,581,189 A | 12/1996 | Brenn | 324/439 | | | | |
| 5,597,482 A | 1/1997 | Melyon | 210/209 | | | | |
| 5,647,416 A | 7/1997 | Desrosiers et al. | 141/351 | | | | |
| 5,685,980 A | 11/1997 | Patapoff et al. | 210/244 | | | | |
| 5,699,669 A | 12/1997 | Gebhard | 42/3.64 | | | | |
| 5,725,758 A | 3/1998 | Chace et al. | 210/85 | | | | |
| 5,795,459 A | 8/1998 | Sweeney | 205/701 | | | | |
| 5,900,212 A | 5/1999 | Maiden et al. | 422/24 | | | | |
| 5,911,870 A | 6/1999 | Hough | 205/701 | | | | |
| 5,928,490 A | 7/1999 | Sweeney | 205/700 | | | | |
| 5,958,229 A | 9/1999 | Filiopoulos et al. | 210/206 | | | | |
| 5,989,396 A | 11/1999 | Prasnikar et al. | 204/290 | | | | |
| 6,007,686 A | 12/1999 | Welch et al. | 204/230.2 | | | | |
| 6,017,447 A | 1/2000 | Wright et al. | 210/192 | | | | |
| 6,110,424 A | 8/2000 | Maiden et al. | 422/24 | | | | |
| 6,180,014 B1 | 1/2001 | Salama | 210/748 | | | | |

FOREIGN PATENT DOCUMENTS

WO    WO-WO 95/29130    11/1995

OTHER PUBLICATIONS

"Steri-Pen", Internet advertisement by Hydro-Photon, www.hydro-photon.com, (May 9, 2000).

Gupta, B.B., et al., "Permeate flux enhancement by pressure and flow pulsations in microfiltration with mineral membranes", *Journal of Membrane Science 70*, 70,(1992),257-266.

Venczel, L.V., "Inactivation of Cryptosporidium parvum Oocysts and Clostridium perfringens Spores by a Mixed-Oxidant Disinfectant and by Free Chlorine", *Applied and Environmental Microbiology*, vol. 63, No. 4, (Apr. 1997),1598-1601.

* cited by examiner

*Primary Examiner*—Krishnan S. Menon
(74) *Attorney, Agent, or Firm*—Deborah A. Peacock; Philip D. Askenazy; Peacock Myers, P.C.

(57) ABSTRACT

Improvements in product water throughput from a reverse osmosis (RO) membrane filter achieved by thinner feed spacers in the RO element, enhanced recovery (ratio of permeate to feed), pressure recovery of the retentate fluid pressure opposing the feed water pressure, and fluid pulsing of the RO element feed stream. The system of the invention preferably comprises a dual head reciprocating pump, an RO element, and a differential pressure activated ("DPA") valve. The DPA valve, in combination with connecting the two pump heads to reduce required pump pressures, generates energy recovery. The frequency and amplitude of the reciprocating pump create a pulse wave in the RO element that improves permeate quality and throughput. A control system preferably monitors system parameters to optimize the reciprocating pump speed and amplitude in order to obtain maximum throughput and permeate quality from any given RO element configuration. Also a highly compact, portable RO system comprising a piston and a DPA valve. The piston separates the feed chamber from the retentate chamber. The pressure difference between the two chambers determines the pressure recovery of the system. The DPA valve opens and closes hydraulically to automatically control the retentate discharge as the system is pumped.

30 Claims, 2 Drawing Sheets

FIG. 1 DUAL DIAPHRAGM PUMP DRIVEN MEMBRANE SYSTEM

Fig. 2

PUMPS FOR FILTRATION SYSTEMS

CROSS-REFERENCE TO RELATED APPLICATIONS

This application claims priority to U.S. Provisional Patent Application Ser. No. 60/446,830, entitled "In-Line Reverse Osmosis Pump", filed on Feb. 11, 2003, and is a continuation-in-part of PCT Application Serial No. PCT/US02/22618, entitled "Dual Head Driven Membrane System", filed on Jul. 16, 2002, which claims priority to U.S. Provisional Patent Application Ser. No. 60/305,912, entitled "In-Line Reverse Osmosis Pump", filed on Jul. 16, 2001.

This application is also a continuation-in-part of U.S. patent application Ser. No. 09/907,092, entitled "Portable Water Disinfection System", filed on Jul. 16, 2001, now U.S. Pat. No. 6,736,966, which is a continuation-in-part of, and claims priority to, U.S. patent application Ser. No. 09/318,468, entitled "Portable Water Disinfection System", filed on May 25, 1999, now issued as U.S. Pat. No. 6,261,464; and which is a continuation-in-part of U.S. patent application Ser. No. 09/514,431, entitled "Portable Disinfection and Filtration System", filed on Feb. 28, 2000, now abandoned, which is a continuation-in-part of U.S. patent application Ser. No. 09/318,469, entitled "Portable Water Filtration and Pump System", filed on May 25, 1999 now abandoned; and which is a continuation-in-part of U.S. patent application Ser. No. 09/579,178, entitled "Portable Water Disinfection System", filed May 24, 2000, now issued as U.S. Pat. No. 6,524,475; and which is a continuation-in-part of U.S. PCT/US00/14513, entitled "Portable Disinfection and Filtration System," filed May 25, 2000; and which is a continuation-in-part of U.S. patent application Ser. No. 09/686,214, entitled "Portable Hydration System," filed Oct. 10, 2000 now U.S. Pat No. 6,558,537; and which claims priority to U.S. Provisional Patent Application Ser. No. 60/266,659, entitled "Mixed Oxidant Electrolytic Cell," filed Feb. 5, 2001.

This application is also a continuation-in-part of U.S. patent application Ser. No. 10/382,971, entitled "Filtration Membrane and Method for Making Same", filed on Mar. 5, 2003, which is a continuation of PCT application Serial No. PCT/US00/33254, entitled "Reverse Osmosis Membrane and Process for Making Same," filed Dec. 8, 2000, which claims priority to U.S. Provisional Patent Application Ser. No. 60/230,895, entitled "Reverse Osmosis Membrane and Process for Making Same," filed on Sep. 5, 2000. The specifications and claims of all of the references listed are incorporated herein by reference.

GOVERNMENT RIGHTS

The U.S. Government has a paid-up license in this invention and the right in limited circumstances to require the patent owner to license others on reasonable terms as provided for by the terms of Contract No. DABT63-98-C-0052 awarded by U.S. Defense Advanced Research Projects Agency.

BACKGROUND OF THE INVENTION

1. Field of the Invention (Technical Field)

The present invention relates to removing particulate and dissolved solids from water by spiral wrapped membrane elements utilizing a dual diaphragm pump system that preferably incorporates pressure recovery, pulsing, fixed recovery (ratio of permeate to feed), and thin feed spacer spiral wrapped membrane elements. The maximum benefit of the system is achieved when reverse osmosis ("RO") is utilized as the membrane technology due to the high pressures inherent in RO membrane processes. However, the system of the present invention is also effective on microfiltration, ultrafiltration, nanofiltration, and other membrane systems. More particularly the present invention relates to alternative means to increase the production of potable water per unit size of membrane element and to reduce the energy cost per unit volume of water treated.

The present invention further relates to a reverse osmosis hand held pump with pressure recovery and in-line components for easy fabrication.

2. Background Art

Removing impurities from drinking water supplies is a major factor in reducing the health risks to the human population. High levels of total dissolved solids (TDS) in water, such as dissolved salts in seawater, make the water unfit for drinking because of the ion imbalance in the human system. Most drinking water in the world today comes from ground or surface water sources and potable water from these sources is produced at small and large municipal drinking water treatment plants. A very small percentage of drinking water is produced from de-salination facilities. There are many settings in which these large systems are not practical. For example, campers, military personnel, and disaster relief situations require small man-portable systems that can treat water from just about any water source to produce potable water. To be effective in such remote settings, a system must be capable of repeated operation with little operator skill, no external power sources, and very little maintenance.

To be fully comprehensive, water filtration must include the capability for both conventional filtration as well as desalination. Conventional filtration can remove particulates that cause turbidity such as dirt, silt, sand, and larger organisms such as Giardia and Cryptosporidium. Reverse osmosis ("RO") technology must also be included to remove ions from such sources as sea water. At sea water concentrations of 35,000 milligrams per liter (mg/L), the system must be effective enough to remove ions to levels less than 1000 mg/L. While sodium and chloride are the two ions of concern in sea water, the system must be able to remove other ions as well. All of these ions are collectively known as TDS.

Existing technology removes TDS utilizing RO technology. Manual pumps utilize a pressure recovery feature to reduce the applied force required to generate the pressure needed to drive the RO process. U.S. Pat. No. 3,749,524, to Jordan, entitled "Manually Operated Pump Utilizing Backpressure for Easement of Pump Stroke," discloses a pressure recovery feature for a pneumatic application. This feature does not apply to fluids such as water and lacks an efficient valve system for retentate discharge and for isolating the RO element in the event that TDS removal is not required. U.S. Pat. No. 4,124,488 to Wilson, entitled "Water Purification by Reverse Osmosis," and U.S. Pat. No. RE 33,135, to Wanner, Sr. et al, entitled "Pump Apparatus," disclose a reverse osmosis pump mechanism with a pressure recovery feature. The present invention addresses the current problems by incorporating a simple valve mechanism for retentate discharge.

U.S. Pat. No. RE 32,144, to Keefer, entitled "Reverse Osmosis Method and Apparatus," discloses a pump mechanism with pressure recovery and accumulator for reverse osmosis. The mechanism does not incorporate an efficient pressure relief and retentate discharge mechanism integral to the piston and rod assembly.

U.S. Pat. No. 5,496,466, to Gray, discloses a portable water purification system with a double piston pump comprising a feed water piston in a feed water cylinder, a concentrate pumping section for removing concentrate from concentrate output, and a concentrate pumping section including a concentrate cylinder and piston wherein the pistons move in opposite axially directions. Gray does not teach differential pressure control or use of a spring or other mechanism for storing energy to average out the forces of the respective strokes. Further, Gray teaches use of a two-piston system only.

U.S. Pat. No. 5,503,736, to Schoenmeyr, discloses a booster pump for a reverse osmosis water purification system wherein the pump has a spring return piston stroked by the pressure of feedwater and a pair of solenoid control valves (controlled by a piston position detector switch) that control the flow of feedwater into and out of the pump to move the piston between stroke and return positions. The Schoenmeyr patent, while disclosing a single piston, employs a two-headed piston with solenoid control valves and a control circuit system, unlike the differential pressure activated valve of the present invention.

Additional tangentially related prior art includes: U.S. Pat. No. 5,589,066, to Gray; U.S. Pat. No. 5,865,980 to Patapoff et al.; U.S. Pat. No. 3,966,364, to Bachle et al.; U.S. Pat. No. 5,531,887, to Miers; U.S. Pat. No. 4,740,301, to Lopez; and U.S. Pat. No. 3,830,372, to Manjikian.

SUMMARY OF THE INVENTION
(DISCLOSURE OF THE INVENTION)

The present invention is of a pumping apparatus and method comprising: a dual head pump comprising a primary feed head comprising a feed diaphragm and a secondary retentate head comprising a retentate diaphragm; pumping fluid to at least one membrane surface; transferring force from the retentate diaphragm to the feed diaphragm to recover energy; providing a fixed recovery via the two heads; and imparting a pulsing pressure wave on the membrane surface. In the preferred embodiment, pumping fluid comprises providing feed fluid to a reverse osmosis membrane, preferably with at least one thin feed spacer element, and most preferably with at least one spiral wrapped element. Differential pressure is provided by a dual activated valve, pulsing is preferably hydraulic, and a plurality of membrane surfaces are provided, preferably wherein the spacing is reduced between the membrane surfaces to improve diffusion.

The present invention is also of a filtration system which provides an optimized pulsed fluid flow to a filtration element. The system comprises a pump, preferably a diaphragm pump, which preferably comprises a primary feed head and a secondary retentate head comprising different swept volumes. The heads are preferably connected either mechanically or hydraulically, wherein a force on the retentate head offsets the pumping force on the feed head. The filtration system preferably comprises a differential pressure activated valve, which seals the discharge port of the retentate head when the feed pressure exceeds the retentate pressure. The connection between the heads and the valve provide a pressure recovery to the system, reducing the energy required to operate the system. The filtration element is preferably a reverse osmosis element, preferably comprising a spiral wrapped element which comprises at least one membrane and at least one thin feed spacer, which preferably comprises a plastic web mesh. The spacer is preferably less than about 0.025 inches thick, and more preferably less than about 0.011 inches thick.

The filtration system preferably comprises automatic and/or manual controls to vary parameters of the system to optimize the permeate quality, flow rate, and system energy requirements. The parameters are preferably pulse frequency and pulse amplitude. The system optionally comprises at least one quality measurement device, including but not limited to a flow meter, conductivity meter, and/or ammeter, and optionally comprises a feedback loop to vary the parameters.

The present invention is also of a method for filtering a substance comprising the steps of providing at least one filtration element; providing a pump which pumps a pulsed flow of the substance to the filtration element; and varying at least one parameter of the pulsed flow to optimize a desired characteristic of permeate filtered by the filtration element and the pump. The pump is preferably a dual head diaphragm pump in which the heads are connected in order to provide pressure recovery, thereby reducing the energy required to filter the substance. The method preferably comprises the step of sealing a discharge port of a retentate head when a feed pressure exceeds a retentate pressure, preferably using a differential pressure activated valve. The filtration element is preferably a reverse osmosis element, preferably comprising a spiral wrapped element which comprises at least one membrane and at least one thin feed spacer, which preferably comprises a plastic web mesh.

The step of varying at least one parameter of the pulsed flow preferably comprises varying the pulse frequency and the pulse amplitude, and preferably further comprises measuring a desired characteristic of permeate, including but not limited to the permeate flow rate, the total dissolved solids in the permeate, and the amperage load on the pump. The method optionally comprises providing a feedback loop to automatically vary the parameter of the pulsed flow, thereby optimizing the desired characteristic of the permeate and pump.

The present invention is additionally of a pressure recovery filtration system comprising a dual head pump comprising a primary feed head, a secondary retentate head and a connection between the two heads; a filtration element; and a hydraulically actuated differential pressure activated valve. The heads preferably comprise diaphragms. The connection is preferably mechanical, optionally comprising a shaft, or alternatively hydraulic. The force on the secondary retentate head preferably offsets the force on the primary feed head. The valve preferably seals the discharge port of said retentate head when a feed pressure exceeds a retentate pressure, and preferably comprises an inlet port connected to said retentate head and an inlet port connected to said feed head. The valve preferably actuates according to a relative pressure difference between said inlet ports.

The present invention is further of a membrane filtration system comprising a piston which separates a feed chamber from a retentate chamber; a membrane filtration element; and a differential pressure activated (DPA) valve which controls the retentate discharge; wherein pressure recovery is provided by a pressure difference between the feed chamber and the retentate chamber acting on the piston. The pressure recovery is preferably significant enough to enable manual pumping of the piston, preferably at a recovery level of about fifty percent. The DPA valve is preferably hydraulically operated, with its operation determined by the relative pressure in the feed chamber and the retentate chamber, so that it operates automatically in accordance with pumping of the piston. The piston preferably comprises a piston shaft, the cross-sectional area of which determines the recovery ratio of the membrane filtration element. The piston shaft is preferably easily replaced, thereby enabling rapid change of the recovery ratio. The system preferably comprises a pressure relief valve.

The membrane filtration system preferably comprises a single cylinder and has a diameter of less than approximately four inches, and more preferably less than approximately two inches. The system preferably has a length of less than approximately twenty-four inches, and more preferably less than approximately fifteen inches. The system preferably weighs less than five pounds, and more preferably less than three pounds. The membrane filtration element preferably comprises a reverse osmosis element, which preferably comprises a spiral wrapped element preferably comprising at least one membrane and at least one thin feed spacer. The spacer optionally comprises a plastic web mesh and is preferably less than approximately 0.025 inches thick, and more preferably less than approximately 0.011 inches thick. The thin feed spacer provides for a reduction in an amount of total dissolved solids at a surface of said membrane.

The invention is also of a method of filtering a substance comprising the steps of pumping the substance with a piston, wherein the piston separates a feed chamber and a retentate chamber passing the substance through at least one membrane filtration element, preferably a reverse osmosis filtration element, thereby separating the substance into permeate and retentate; and discharging the retentate using a differential pressure activated (DPA) valve. The method preferably comprises operating the DPA valve hydraulically, preferably according to the relative pressure in the feed chamber and the retentate chamber. This operation is preferably automatic as the substance is pumped. The method further comprises utilizing a pressure difference between the feed chamber and the retentate chamber acting on the piston to reduce the force necessary to pump the substance, preferably to a level that enables manual operation of the system.

A primary object of the present invention is to provide an improved filtration system for TDS reduction that provides potable water.

Another object of the present invention is to provide an improved filtration system that is compact in size for one person to easily carry. A further object of the present invention is to provide an improved filtration system that can be operated purely with manual power as the only energy source.

A primary advantage of the present invention is a pressure recovery feature in the pump that utilizes a simplified valve mechanism for retentate discharge.

Another advantage of the apparatus is a pulsing mechanism in the pump that minimizes polarization concentration in the RO membrane thereby significantly reducing the applied pressure and improving the permeate flux produced for a given amount of power applied to the pump.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE PREFERRED EMBODIMENT (BEST MODES FOR CARRYING OUT THE INVENTION)

Dual-Head Pump

The present invention is of a motor driven dual headed pump that incorporates a differential pressure activated ("DPA") valve to provide a system that incorporates some or all of the innovations discussed previously. High Total Dissolved Solids ("TDS") feed water (e.g., seawater or brackish water) is sucked into the primary diaphragm head of a dual-headed diaphragm pump. The primary head of the pump is the larger of the two pump heads. Check valves on the inlet and exit of the pump head force water to be directed in one direction only through the pump head. As feed water discharges through primary pump head 28 (FIG. 1), the feed water enters the feed end of the RO element housing. Water passes longitudinally through the RO element. A portion of the water passes through the membrane producing clean permeate water. The remaining water is higher TDS concentration (relative to the TDS of the feed water) that is retentate discharge from the RO element. The retentate is directed to the second, smaller diaphragm pump head. The ratio of the sizes of the pump heads explicitly defines the recovery of the RO system. With the smaller pump head being, e.g., 70 percent, of the volume of the primary pump head, the recovery of the system is approximately 30 percent. In other words, 30 percent of the feed volume is forced through the membranes of the RO element, thereby producing a permeate volume that is 30 percent of the feed. Various recovery ratios may be used depending upon the configuration of the system, and the fluid being treated. This feature addresses a first benefit of the invention, namely, enhanced recovery.

Incorporating RO elements in the system with a thin feed spacer provide additional capacity to the system. By utilizing the thin spacer, the capacity of an existing RO plant is increased significantly by simply replacing existing technology RO elements with the thin feed spacer elements, and then adding the dual diaphragm pump system to provide the benefits of that system.

Diaphragm pumps produce an inherent pulse to the fluid flow stream. This is by virtue of the reciprocal motion of the pump stroke mechanism. In conventional diaphragm pumps, the stroke of the pump is controlled by an adjustable eccentric mechanism within the gear housing of the pump. This is usually controlled by a control knob or motor drive on the exterior of the pump. The frequency of the pump is controlled by the speed of the drive motor on the pump. Most diaphragm pumps manufactured today can be driven by a variable speed motor. This combination of stroke length and speed control allows variability of all key operational parameters that are important to optimizing the flow characteristics within the RO element. In addition, by monitoring torque on the pump drive motor, the stroke length and frequency are electronically optimized, or tuned, so that the optimal stroke and frequency are established for the RO element size and hydraulic system in question. The optimum conditions are achieved when the torque (or load) on the motor is minimized at the rated flow rate of the membrane element. This feature addresses the benefits from fluid flow pulsing.

Another advantage is realized by connecting the two different sized pump diaphragms together. The feed pressure to the RO element is roughly equal to the retentate (or discharge) pressure from the RO element. Theoretically, flow through the feed spacer in the RO element is zero. Practically, there may be a pressure drop of about ten percent across the element. For purposes of example, assume that there is no pressure drop across the element. This means that the same pressure is applied on the large diaphragm pump head as there is on the small diaphragm pump head. By connecting the two diaphragms with a common shaft, hydraulics in the pump heads set up so that force on the small head opposes, or offsets, the force on the large head. Therefore, the net working force on the pump is equal to the value of the recovery of the RO element. In the example discussed here, the force generated by the small pump head (70 percent) offsets the force on the large head (100 percent) so that the net force required to operate the system is 30 percent. This is defined as pressure recovery. Stated in another fashion, the energy required to operate the RO system is 30 percent of that required to operate a system that is comprised of one diaphragm. Indeed, conventional RO plants use high pressure pumps to provide the feed pressure for the RO elements, with no attempts to utilize pressure recovery. This feature alone can save 70 percent of the energy required to operate an RO plant.

Thin feed spacers that provide more element surface in the RO element, combined with pressure recovery, can easily produce a 100 percent improvement in kilowatt per gallon of water produced. Pulsing benefits are not impacted by these two features. Pulsing contributes additional benefits that are not degraded by the additional RO surface area or the pressure recovery features.

All five of the benefits discussed above are not necessarily mutually beneficial. For example, the benefits of diffusion may be offset by pulsing.

The system integrates any or all of five features, or combinations thereof, of membrane technology for water treatment. The five features comprise the use of: (1) thin feed spacer spiral wrapped elements; (2) enhanced recovery (ratio of feed to permeate); (3) diffusion effects; (4) fluid pulsing; and (5) pressure recovery. The system offers maximum benefit for reverse osmosis (RO) membranes due to the high working pressures associated with seawater desalination. Those of ordinary skill in the art of membrane technology will recognize that this system also has benefit for fluids other than water, and for membrane technology that includes microfiltration, ultrafiltration, and nanofiltration, in addition to the obvious advantages to RO technology.

Figure 1:
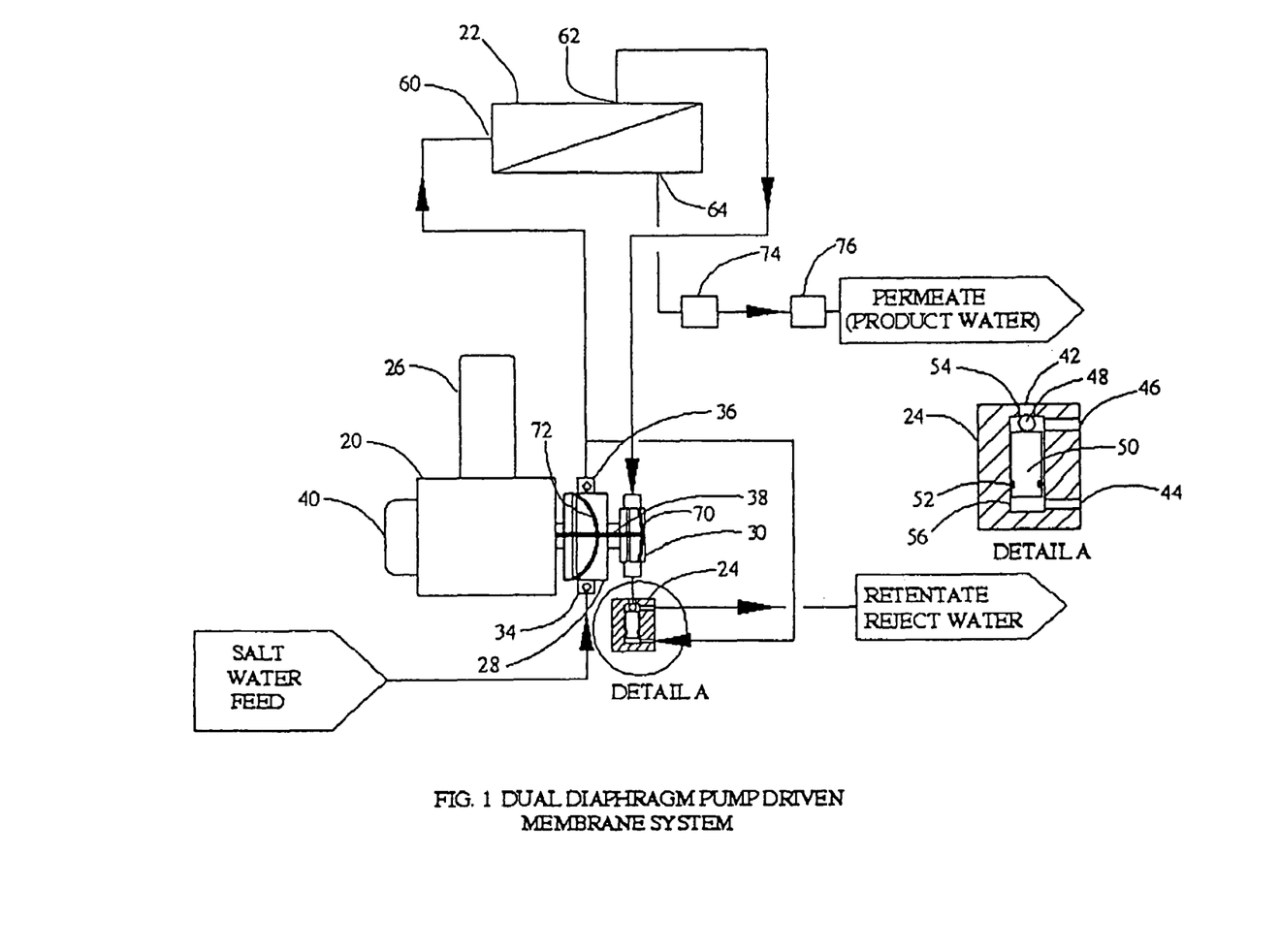
FIG. 1 is a block diagram of the dual head pump filtration system of the present invention.

The preferred embodiment is illustrated in FIG. 1. As shown therein, pump 20 comprises a diaphragm pump design with two diaphragm heads, primary or feed head 28, and secondary or retentate head 30. In an alternate embodiment, the pump can be a plunger type pump, a hydraulic activated diaphragm pump, a solenoid activated pump, or other configuration. One key feature of the preferred pump configuration is that pump 20 imparts a pulsing fluid and pressure wave on the fluid being transferred. Another primary feature of pump 20 is that pump feed diaphragm 72 and retentate diaphragm 70 are connected preferably mechanically by shaft 38, or alternatively hydraulically, in order that the fluid pressure acting on retentate head 30 transfers force to feed head 28. The interconnectivity of feed diaphragm 72 and retentate diaphragm 70 ensures that fluid pressure on the left side of the diaphragm of retentate head 30 partially offsets fluid pressure on the right side of the diaphragm in feed head 28. This feature provides pressure recovery and significantly reduces the total energy to operate the system versus a system that utilizes feed pressure only.

High TDS feed water (e.g., seawater) enters or is sucked into feed head 28 at feed head inlet port 34. Lower TDS feed water (i.e., brackish water) or other waters of varying degrees of ion concentration also benefit from this system. Feed head inlet port 34 incorporates a check valve that prevents backflow of water out of feed head 28 during the pressure stroke of pump 20. Fluid is compressed on the right side of feed diaphragm 72 and is expelled out of feed head discharge port 36. Feed head discharge port 36 incorporates a check valve to prevent fluid downstream of feed head 28 from returning to feed head 28 during the suction stroke of pump 20. Fluid discharged from feed head 28 discharge port 36 is transferred to feed inlet port 60 on RO element 22.

Benefits of thin feed spacer designs in RO elements include more membrane surface per RO element volume, concentration polarization reduction via TDS diffusion effects, and increased surface velocity and shear, all of which contribute to increased RO element throughput and product water quality. Although thin feed spacers are preferable in the system of the present invention, conventional feed spacer elements may also be used. Thin feed spacer elements improve the overall efficiency and throughput of the system because there is more membrane area in the same element size housing.

Permeate, or product water, from RO element 22 is discharged through permeate water port 64. High TDS retentate water is discharged from RO element 22 via retentate discharge port 62. Assuming no expansion of RO element 22 and hydraulic lock of the system (no air), the law of conservation of mass dictates that the volume of water entering RO element 22 inlet port 60 equals the sum of the volume of water discharged at permeate discharge port 64 and retentate discharge port 62. Recovery in an RO element is defined as the volume of permeate (or product water) discharged from an RO element versus the feed water entering the element. Therefore, the recovery of an RO element is explicitly defined by the ratio of the swept volume of pump 20 feed head 28 versus the volume of retentate head 30. The difference in volume between the RO element feed volume and the retentate volume is the permeate, or product water, volume.

In order for energy recovery as well as fixed recovery (ratio of permeate to feed) to work, the discharge port retentate head 30 is closed in order for pressure to build up in the system. The ultimate pressure obtained is a function of the osmotic pressure of the feed water in RO element 22. Closure of the discharge port of retentate pump head 30 is achieved with differential pressure activated (DPA) valve 24. DPA valve 24 is activated by equal pressures applied across different diameter ports in DPA valve 24. Pressure is acted on the circular area of the back of piston 50 which is defined by the diameter of DPA valve bore 56. The force on the back of piston 50 is defined by the pressure multiplied by the area. The force on the front of piston 50 is defined by diameter 54 of inlet port 42. Since the pressures are unequal (feed and retentate), piston 50 is driven home with greater force on the rear of piston 50 to seal inlet port 42. Port 42 remains sealed during the compression stroke of pump 20. On the return stroke of pump 20, pressure in the system is relieved and there is no net force applied to piston 50 in DPA valve 24 to seal port 42. On the return stroke of pump 20, fluid on the left side of diaphragm 70 is driven through port 42 of DPA valve 24 and is expelled out of retentate discharge port 46. Fluid cannot back flow out of the inlet port of retentate head 30 since RO element 22 is a closed system and check valve 36 in feed head 28 will not allow return of fluid to feed head 28.

The appropriate fluid pulse amplitude and frequency significantly improves permeate throughput and quality for any given unit area of membrane surface. Due to fluid dynamic considerations, the optimal fluid amplitude and frequency for any given RO element configuration is unique to that configuration. Amplitude of a diaphragm pump is defined by the stroke length of pump 20. A shorter stroke produces less amplitude (volume of fluid per stroke). Stroke length (amplitude) is controlled on diaphragm pump 20 by virtue of manual or motor driven eccentric control knob 40. Likewise, the frequency of the pump stroke is explicitly controlled by the rotational speed of pump motor 26. By virtue of the appropriate controls, amplitude and frequency can be controlled either manually or electronically. By empirically determining the appropriate amplitude and frequency for a given RO element configuration, the correct amplitude and frequency can be dialed in manually to achieve optimal throughput and permeate quality. Conversely, a feedback control loop can be programmed into a computer to allow the pump to electronically optimize product throughput and quality.

The three key parameters are easily measured. First, energy into the system can be optimized by measuring the amperage load on pump motor 26. Second, permeate, or product water, quality can be easily measured by optional conductivity meter 74 which measures the TDS in the product water and verifies performance of RO elements. Other types of water quality detectors may additionally be used. The third and final parameter is the permeate flow rate. This is preferably measured by flow transmitter 76. Alternatively, since the recovery of the system is explicitly defined by the ratio of the swept volumes of feed head 28 versus retentate head 30, then the permeate flow rate is easily determined by the frequency and amplitude of pump 20. The frequency may be electronically monitored by the speed of pump motor 26, and the amplitude may be preferably monitored by the motor position of stroke control knob 40. Optimization control schemes use hardware and software programmable logic controllers ("PLC"). The system is preferably optimized by using a PLC to monitor the pump motor amplitude and speed, product water quality and flow rate to optimize the efficiency of the system.

Significant features of the system of the present invention are that the two interconnected heads of the pump simultaneously provide: (1) a fixed recovery (ratio of product water to feed water); (2) the two interconnected heads provide energy recovery by transferring force from the retentate diaphragm to the feed diaphragm; and (3) the pump imparts a pulsing pressure (and fluid) wave on the RO element.

INDUSTRIAL APPLICABILITY

The dual head pump invention is further illustrated by the following non-limiting example.

EXAMPLE 1

The present invention was developed under a contract funded the U.S. Department of Defense's Defense Advanced Research Projects Agency ("DARPA") to produce a small portable system that will allow individual soldiers to treat any water anywhere to drinking water quality. The research did not focus on membrane chemistry, but rather construction and hydraulic flow characteristics of spiral-wrapped RO element designs. Concurrent with design of the RO elements, a hand pump device was developed that utilizes various features including a simple differential pressure activated valve to produce pressure recovery in the pump to significantly reduce the applied force required to operate the pump.

Advantages of the invention, as demonstrated by the research, include as follows:

Enhanced Recovery. Recovery is defined as the amount of permeate water (clean product water) divided by the volume of feed water that enters an RO element. Typically, RO elements operating on seawater utilize a recovery of 10 percent or less. Extensive tests were conducted on the membranes to determine the amount of water that can be driven through a membrane and still produce acceptable quality permeate. These studies showed that a 30 percent recovery was feasible using the present invention.

Thin Feed Spacer. The feed spacer in a spiral wrapped RO element was constructed of a plastic web mesh that held the faces of the membranes apart so that feed water could flow longitudinally down the length of the element with minimal pressure loss while allowing the water to cross the membrane. On the opposite side of the membrane leaf was the permeate carrier. The permeate carrier was a porous but more structurally rigid material that withstood compression from the membrane surface, but allowed the permeate to flow spirally to a central collection tube where the permeate was collected. Current construction techniques limit existing feed spacer thickness to approximately 0.011 inches thick. Most RO elements utilize feed spacers that are approximately 0.025 inches thick. Hydraulic calculations indicated that a feed spacer that is 0.003 inches thick is adequate to allow flow through the element. The primary advantage of a thin feed spacer is that more membrane element material can be wrapped into a smaller diameter RO element housing, thereby significantly increasing the membrane surface in the RO element. More membrane surface equates to more product water throughput.

Diffusion Effect. Concentration polarization is defined as the buildup, or accumulation, of total dissolved solids (TDS) at the surface of the membrane. As water molecules flow through the membrane surface, ions are rejected and are retained on the feed side of the membrane material. This accumulation of ions represents an increase in the TDS at the surface of the membrane, thereby increasing the osmotic pressure required to drive the water molecules through the membrane surface. The negative result is higher operating pressures and lower production. Diffusion effects (tendency of molecules to diffuse uniformly in a solution) were improved with reduced separation between the membrane faces. Coincidentally, diffusion effects were dramatically improved when the separation between the membrane surfaces approached 0.003 inches. Improved diffusion resulted in reduced concentration polarization resulting in higher permeate quality and throughput. Another feature of thin feed spacers that is conducive to lower TDS is the increased fluid shear which is produced with higher fluid velocity that results from equivalent volumes of feed water traversing a thinner feed spacer thickness.

Hydraulic Feed Water Pulsing. Pulsing of the feed stream to an RO element has a beneficial effect for reduction of concentration polarization, and subsequent improvement in product water throughput. Tests conducted verified this effect, and show improvements, in some cases, greater than 100 percent in product water throughput versus steady flow. These same tests also demonstrated applied pressure reductions of 18 to 19 percent. In other words, in steady flow tests, 800 psi is required to produce acceptable quality permeate. With pulsing, the mean operating pressure that produced the same permeate volume and quantity was 650 psi. Each RO element physical configuration had an optimal frequency and fluid amplitude to achieve maximum performance.

Pressure Recovery via Differential Pressure Activated ("DPA") Valve. During development of the hand held manual RO pump of the invention, a DPA valve was developed that significantly simplified the design of a handheld RO pump and enabled a pressure recovery feature that significantly reduced the force required to operate the pump. This pump had only three metal parts, namely three stainless steel springs that acted to load check valves in the pump. All other components of the pump were injection molded, thereby producing a simplified RO hand-held pump that is low cost and therefore is disposable.

In-Line Pump

Another preferred embodiment of the present invention comprises a two component filtration system comprising a water pump mechanism and a reverse osmosis filter for reducing the level of TDS in the water, preferably resulting in potable water. In the preferred embodiment, the pump mechanism includes a pressure recovery feature that reduces the total force required to overcome osmotic pressure in the reverse osmosis membrane. For reverse osmosis operation, an embodiment of the pumping mechanism includes a mechanism for storing energy on the suction stroke such that the force for operation will be averaged over the suction and pressure stroke, rather than all of the force being applied on the pressure stroke. This mechanism reduces the peak pump force nominally by half when used to reduce TDS in seawater.

In one embodiment, the inventive system is portably configured for ease of carriage in the field. As a non-limiting example, the dimensions of the system, in storage configuration, are preferably approximately 4 inches wide by approximately 4 inches deep by approximately 24 inches in length, and are more preferably approximately 2 inches wide by approximately 2 inches deep by approximately 15 inches in length. The total weight is preferably less than five pounds, and more preferably less than three pounds when dry.

The first major component of this embodiment of the present invention is the pump mechanism. Referring to a preferred embodiment, pictured in FIG. 2, the pump mechanism comprises housing 100, which is optionally fabricated from any of several materials known by anyone versed in the art of pump and cylinder manufacturing, including but not limited to glass or fiber reinforced injection molded plastic. The cylinder has end cap 102 that is preferably attached to the end of the cylinder by conventional threads or another locking mechanism. One of the major benefits of this design is the in-line configuration of the RO element and the pump piston. This configuration makes the injection molding tooling inexpensive and provides for low cost pump housing parts. This configuration also minimizes post mold fabrication processes. The housing optionally comprises cast or machined aluminum, titanium, steel, or any suitable material that is compatible with high TDS water and high pressure.

Figure 2:
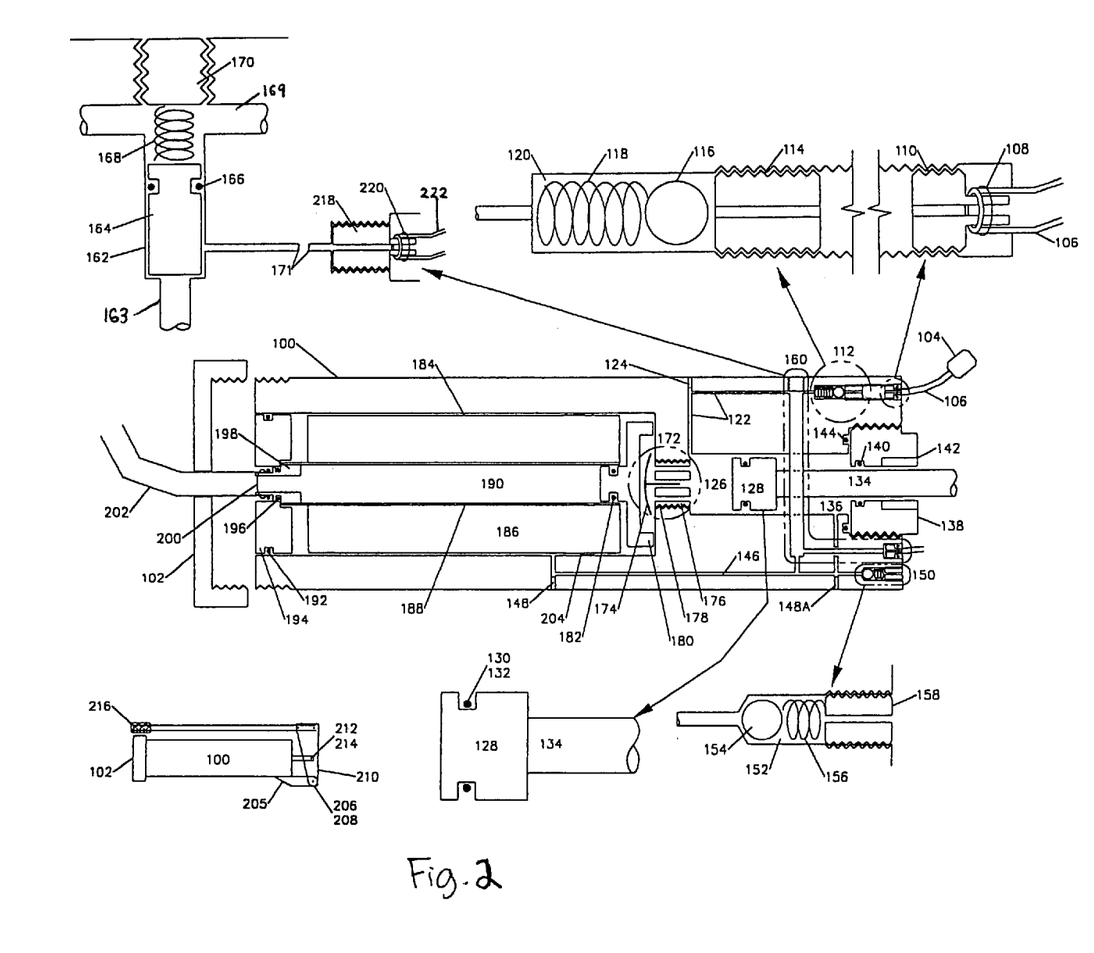
FIG. 2 is a block diagram of the in-line pump filtration system of the present invention.

The handle end of the pump housing incorporates a check valve 112 on the inlet stream. Inlet check valve 112 comprises ball 116, spring 118, and retainer seat 114 inside chamber 120 within housing 100. Check valve 112 may alternatively comprise poppet, disc, or other sealing mechanisms and springs made of material compatible with the fluid being transferred, for example stainless steel. Spring 118 provides positive sealing of the check valve in any orientation of the pump. Inlet check valve 112 allows fluid to enter pump chamber 126 through intake passage 122 in housing 100 during the suction stroke and prevents water from exiting through the port on the compression stroke. In the preferred embodiment, intake passage 122 is cast into housing 100 during the injection molding process. In alternative embodiments, intake passage 122 is machined in housing 100 or a metal or other appropriate material tube is placed in the mold prior to injection molding. If required, intake passage plug 124 seals any holes or passages required for injection molding or machining but not needed for pump operation. Plug 124 is installed using conventional threads or snap fitting for removable applications and spun or solvent welded for permanent applications. Water entering through inlet check valve 112 of the pump mechanism preferably comprises flexible tube 106 and strainer 104 to filter large particles from the water stream prior to entry into pump chamber 126. Alternate embodiments eliminate tube clamp 108 and combine tube fitting 110 and retainer seat 114 into a single component.

Traveling in pump housing 100 is piston 128 comprising, for example, injection molded plastic, cast or machined metals, or any combinations thereof, whose materials are compatible with the fluid being pumped. Piston 128 incorporates seals 130 and 132 which isolate pump chamber 126 from retentate chamber 136. The seals are oriented in the piston ring grooves in such a manner to ensure positive sealing of the different chambers. In an alternative embodiment, the seals comprise piston rings or other sealing technology commonly known by those versed in the art. Piston 128 is moved in and out of pump housing 100 by means of piston shaft 134. Force on piston shaft 134 is applied by pump jack mechanism described below.

Piston shaft 134 is sealed to cylinder cap 138 by means of shaft seal 140 with sealing means previously discussed. Piston shaft 134 preferably comprises hollow titanium with an injection molded plastic or cellulose core. Alternate embodiments of piston shaft 134 comprise cast or machined, solid, hollow or filled aluminum, steel, stainless steel, or plastic; other suitable material that is compatible with high TDS water and the forces on the shaft; or any combinations thereof. Preferably, cylinder cap 138 and piston shaft 134 allow rapid changes of the recovery ratio (permeate to feed water ratios). This is simply achieved by changing the diameter of piston shaft 134, which necessitates changing cylinder cap 138 so that the correct bore and seal 140 match the new diameter.

Cylinder cap 138 is attached to housing 100 preferably using conventional threads, or alternatively, other attachment means, and is sealed to retentate chamber 136 by means of end cap seal 144 with sealing means previously discussed. Cylinder cap 138 preferably comprises injection molded plastic and shaft ware busing 142, preferably brass. Cylinder cap 138 may alternately comprise cast or machined metal, machined plastic, or any combinations thereof. Other alternate embodiments of cylinder cap 138 eliminate shaft ware bushing 142 and split cylinder cap 138 into two major parts where one part contains the seals and the second part contains the threads. This two-part configuration separates the sealing and threading functions and permits seals to remain stationary while the threads are tightened.

Water is pumped from pump chamber 126 into RO element chamber 184 during the compression stroke. Outlet check valve 172 allows fluid to enter RO element chamber 184 during the compression stroke and prevents water from exiting through the port on the suction stroke. Outlet check valve 172 preferably comprises a rubber umbrella type check valve 174 covering holes 176 in plate 178 integral to housing 100. In alternate embodiments, plate 178 is a threaded plated screwed into place, a non-threaded plate spun or solvent welded into place, or another assembled mechanism. Other alternate embodiments of check valve 172 comprise ball, poppet, disc, spring, or other sealing mechanisms know by those versed in the art.

RO chamber 184 contains RO element 186. The annulus between RO element 186 and housing 100 is divided by seal 204 into a feed side, between outlet check valve 172 and seal 204, and retentate side, other side of seal 204. The operation of RO element 186 is described in detail below. Briefly, water enters the feed end of RO element 185, flows longitudinally through element 186, and emerges either from the other end as retentate or from RO element center tube 188 as permeate. RO element 186 is held laterally in place by spacer 180 with seal 182, seal 204, and RO end cap 194. Spacer 180 and RO end cap 194, with constraint and pressure provided by end cap 102, longitudinally hold RO element 186 in place. Seal 192, between RO element end cap 194 and housing 100, and seal 196, between RO element end cap 194 and RO element center tube 188, prevent water leaking from RO chamber 184 and commingling of retentate and permeate streams. Permeate water exits the invention through flexible tube 202 passing through a hole in end cap 102. In the preferred embodiment, flexible tube 202 is attached to RO element center tube 188 by tube fitting 198 and tube clamp 200. Tube fitting 198 is preferably spun welded inside of RO element center tube 188. Alternative embodiments for attaching tube fitting 198 to RO element center tube 188 comprise solvent welding, conventional threads, snap or push connection, or other mechanisms known by those versed in the art. Tube fitting 198 may alternately be cast integrally with center tube 188. Retentate water exits RO chamber 184 through retentate return passage 146 in housing 100 to retentate pump chamber 136. In the preferred embodiment, retentate return passage 146 is cast into housing 100 during the injection molding process. Retentate return passage 144 may alternately be machined in housing 100 or be a metal or other appropriate material tube placed in the mold prior to injection molding. If necessary, retentate return passage plugs 148, 148A seal any holes or passages required for injection molding or machining but not needed for pump operation. Plugs 148, 148A are preferably installed using conventional threads or snap fittings for removable applications, or are spun or solvent welded for permanent applications.

Pressure recovery in the pump occurs as pressure is generated in pump chamber 126, passes through RO element 186, and returns through retentate return passage 146 to retentate pump chamber 136. There is effectively very little flow resistance through RO element 186 from the feed side to the retentate side, and thus very little pressure drop from the feed side to the retentate side. Pressure recovery in the pump occurs because the high retentate pressure in chamber 136 acting on the annular area on the back side of piston 128 (which is the cross section area of piston 128 minus the cross section area of shaft 134) partially offsets the pressure in pump chamber 126. The theoretical pressure recovery factor is the ratio of annular area to piston 128 cross section area.

Differential pressure activated (DPA) valve 160 controls the release of the retentate from retentate chamber 136. The DPA valve comprises poppet 164, spring 168, seal 166 and plug 170 inside chamber 162 within housing 100. DPA valve 160 senses and responds to pressures in pump chamber 126 and retentate chamber 136. Based on these pressures, poppet 164 is held (1) in the "closed" position and blocks the discharge line 171 or (2) in the "open" position and exposes discharge line 171. The termination of discharge line 171 preferably comprises tube fitting 218, flexible tube 222, and tube clamp 220. The preferred location of DPA valve 160 is shown in FIG. 2. In alternate embodiments, DPA valve 160 may alternately be connected in other locations, as long as pump inlet 169 is located between inlet check valve 112 and outlet check valve 172 and retentate inlet 163 is located between the retentate side of RO element 186 and retentate chamber 136. A more restrictive location of retentate inlet 163 is between the start of retentate return passage 146 and retentate chamber 136. This more restrictive location allows retentate to be discharged without having the retentate reenter RO chamber 184.

DPA valve 160 operates as follows. On the compression stroke, pressures in pump chamber 126 and retentate chamber 136 are approximately equal. Pump chamber 126 pressure may be slightly higher than retentate chamber 136 pressure due to pressure losses in RO element 186 or elsewhere in the pump. Poppet 164 is in the "closed" position and blocks discharge line 171 from retentate chamber 136. Poppet 164 is held firmly in place by applied forces due to the product of the applied pressures and the areas over which they are applied. The design of poppet 164 and chamber 162 are such that poppet 164 area exposed to pump chamber 126 pressure is larger than poppet 164 area exposed to retentate chamber 136 pressure. The differences in exposed poppet 164 areas results in a large force to firmly hold poppet 164 in place during the compression stroke.

On the combined intake/discharge stroke, pressure in pump chamber 126 reduces to zero (gauge pressure) or slightly negative as water is sucked into chamber 126. Movement of piston 128 during the intake stroke attempts to compress the liquid in retentate chamber 136 resulting in a high retentate chamber 136 pressure. The resulting pressure imbalance between retentate chamber 136 and pump chamber 126 moves poppet 164 to the "open" position and exposes discharge line 171, allowing retentate chamber 136 liquid to pass through discharge line 171. Excessive movement of poppet 164 is prevented by plug 170. At the end of the combined intake/discharge stroke, flow through discharge line 171 ceases due to lack of fluid, the pressure reduces, and spring 168 pushes poppet 164 into the "closed" position. Poppet 164 and plug 170 preferably comprise injected molded plastic. In the preferred embodiment poppet 164 seats and seals directly against a seat injection molded or machined into housing 100. Seat end of poppet 164 is optionally covered with rubber or a similar material to assist in seating. Poppet 164 and/or plug 170 may optionally comprise cast or machined metal or machined plastic. In the preferred embodiment, chamber 162 is cast into housing 100 during the injection molding process. In alternate embodiments, chamber 162 is machined into housing 100 or a metal or other appropriate material tube is placed in the mold prior to injection molding.

Pressure relief valve 150 is incorporated into housing 100. Pressure relief valve 150 preferably comprises ball 154, spring 156, and plug 158 inside chamber 152 within housing 100. Alternative embodiments comprise ball, disc, poppet, spring, or other sealing mechanisms. Pressure relief valve 150 opens and relieves pressure when pressure on ball 154 is sufficient to overcome the force in spring 156 which keeps ball 154 in the closed position. The purpose of pressure relief valve 150 is to limit the pressure in retentate chamber 136 that can be developed by the pump to a safe operating level. The preferred location of pressure relief valve 150 is shown in FIG. 2. In alternate embodiments, pressure relief valve 150 may be located anywhere between outlet check valve 172 and retentate chamber 136. This span of locations allows pressure relief valve 150 to be effective on both compression stroke and the combined intake/discharge stroke of the pump as desired. In the preferred embodiment, chamber 152 is cast into housing 100 during the injection molding process. In alternate embodiments, chamber 152 is machined in housing 100 or a metal or other appropriate material tube is placed in the mold prior to injection molding.

The second major element of this embodiment of the present invention is a reverse osmosis filter system. Reverse osmosis filters are very efficient filter systems removing very small particles including ions such as sodium and chloride. In order to drive high TDS water through the RO membrane, the osmotic pressure of the water must be overcome. In the preferred embodiment, this system comprises a conventional spiral wound design RO filter element 186. In other embodiments, RO filter element 186 comprises ceramic membrane, carbon membrane monotubes, or other RO elements known to those versed in the design of RO elements. High TDS feed water at a pressure exceeding the osmotic pressure flows in to one end of cylindrical filter element 186. As the water flows longitudinally through the length of filter element 186, the water runs across the surface of the spiral wrapped membrane to the other end of filter element 186. As the water flows across the membrane surface, the ions are rejected and water molecules flow through the membrane. As the water flows longitudinally through filter element 186, the water on the feed side of the membrane surface increases in ion concentration (higher TDS). The higher TDS water coming out of RO element 186 is referred to as retentate. The purified water which has passed through the membrane and into permeate chamber 190 is referred to as permeate.

The recovery ratio of RO element 186 is defined as the ratio of the volume of permeate (finished water) that is expelled to the feed water volume that is generated in one pump stroke in pump chamber 126. The difference in volume between pump chamber 126 and retentate chamber 136 is uniquely defined by the volume of pump shaft 134. The recovery ratio of RO filter element 186 is explicitly defined by the square of the ratio of pump shaft 134 diameter to retentate chamber 136 diameter. Further, by the principal of conservation of mass, the feed water volume that enters RO element 186 generated in one pump stroke is the sum of permeate volume expelled plus retentate volume expelled. Thus the permeate volume produced in one stroke of the pump is equivalent to the volume of the portion of pump shaft 134 that is within retentate chamber 136, or is alternatively determined by the cross-sectional area of pump shaft 134.

The RO filter assembly as shown in FIG. 2 comprises a separate pressure chamber 184 with seals 192, 196 and 204 to isolate the inlet feed stream, the retentate rejection stream and the permeate product stream. The RO filter element 186 can easily be changed by removing end cap 102 and RO end cap 194 and withdrawing RO element 186 from RO chamber 184. Installation is the reverse procedure. Circular seal 204 on the outside of RO element 186 and inside cylinder housing 100 prevents retentate water from returning to the feed side of the RO filter element.

To achieve mechanical advantage during pumping, commonly known pump jack mechanisms may be employed to force pump shaft 134 in and out of the pump housing 100. In the preferred embodiment, force on piston shaft 134 is applied by manual force applied to a pump jack mechanism. Optionally, in order to save size or weight, a simple piston may be utilized. Alternatively a piston shaft force generating mechanism comprising a reciprocating motion drive powered by petroleum based fuel drive engines, electric motors, or any other power generating device may be employed. In the preferred embodiment, lever arm 210 length for obtaining the mechanical advantage corresponds to the overall length of pump housing 100. The end of lever arm 210 is optionally fitted with a large surface area pad 216 to reduce the point source load on the human anatomy. Pad 216 is preferably contoured to be conformal with pump housing 100 to facilitate compact storage. The length of lever arm 210 is optionally removably securable to pump housing 100 or end cap 102 for travel. In the preferred embodiment, housing eccentric 205 is an integral part of housing 100. In alternate embodiments, housing eccentric 205 comprises a separate part comprising injection molded plastic; cast or machined aluminum, steel, titanium; or other suitable material that is compatible with the pumping forces achieved, attached to housing 100 by conventional threaded fasteners or other means. In the preferred embodiment, lever arm 210 is a one piece injection molded part and is preferably attached to housing eccentric 205 by pin 206 with end clips 208 and to pump shaft 134 by pin 212 with end clips 214. In alternate embodiments, lever arm 210 comprises one or more pieces of injected molded plastic; cast or machined, solid, hollow, or filled aluminum, steel, or titanium; or other suitable material that is compatible with the pumping forces achieved.

Conventional water filtration using a micron filter typically does not require significant differential pressure to force the water through the filter element. Typical pressures are less than 100 pounds per square inch (psi). However, for reverse osmosis membranes, the pressure to drive the water across the membrane is a function of the TDS in the water. The pressure force required can be significant—several hundred psi. Most hydraulic jack mechanisms have a pressure stroke and a return stroke. The pressure stroke requires force and the return stroke is usually very low force that is associated with friction in the pump device. In the preferred embodiment of the present invention, the pump jack mechanism incorporates an energy storage device to store up energy in the return stroke, as described above. The stored energy is then released on the pressure stroke to ease the force required to implement the pressure stroke. Under ideal conditions at a given TDS level, the stored energy is approximately half of the total force required to drive water through the RO membrane. Likewise, the peak force required of the operator to operate the pump in the power (pressure) stroke is reduced by half.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A membrane filtration system comprising:
    a first piston, said first piston separating a feed chamber from a retentate chamber;
    a membrane filtration element; and
    a differential pressure activated (DPA) valve which controls retentate discharge, said DPA valve disposed downstream of said membrane filtration element and said retentate chamber with respect to a flow of retentate, said DPA valve comprising:
        a single housing comprising a port in fluid connection with an inlet to said filtration element, an inlet port for receiving retentate from said filtration element, and a retentate discharge port; and
        a single second piston slideably disposed within said single housing, said second piston positively sealing said inlet port when a feed pressure on a first face of said second piston exceeds a retentate pressure on a second face of said second piston;
    wherein pressure recovery is provided by a pressure difference between the feed chamber and the retentate chamber acting on said first piston.

2. The membrane filtration system of claim 1 wherein the DPA valve is hydraulically operated.

3. The membrane filtration system of claim 1 wherein operation of the DPA valve is determined by relative pressure in the feed chamber and the retentate chamber.

4. The membrane filtration system of claim 3 wherein the DPA valve operates automatically in accordance with pumping of said first piston.

5. The membrane filtration system of claim 1 wherein said first piston comprises a piston shaft.

6. The membrane filtration system of claim 5 wherein a recovery ratio of the membrane filtration element is determined by a cross-sectional area of the piston shaft.

7. The membrane filtration system of claim 6 wherein the piston shaft is easily replaceable, thereby enabling rapid change of the recovery ratio.

8. The membrane filtration system of claim 1 further comprising a pressure relief valve.

9. The membrane filtration system of claim 1 comprising a single cylinder.

10. The membrane filtration system of claim 1 having a diameter of less than approximately four inches.

11. The membrane filtration system of claim 10 having a diameter of less than approximately two inches.

12. The membrane filtration system of claim 1 having a length of less than approximately twenty-four inches.

13. The membrane filtration system of claim 12 having a length of less than approximately fifteen inches.

14. The membrane filtration system of claim 1 having a weight of less than five pounds.

15. The membrane filtration system of claim 14 having a weight of less than three pounds.

16. The membrane filtration system of claim 1 wherein said membrane filtration element comprises a reverse osmosis element.

17. The membrane filtration system of claim 16 wherein said reverse osmosis element comprises a spiral wrapped element.

18. The membrane filtration system of claim 17 wherein said spiral wrapped element comprises:
    at least one membrane; and
    at least one thin feed spacer.

19. The membrane filtration element of claim 18 wherein said at least one thin feed spacer comprises a plastic web mesh.

20. The membrane filtration system of claim 18 wherein said at least one thin feed spacer is less than approximately 0.025 inches thick.

21. The membrane filtration system of claim 20 wherein said at least one thin feed spacer is less than approximately 0.011 inches thick.

22. The filtration system of claim 18 wherein said at least one thin feed spacer provides for a reduction in an amount of total dissolved solids at a surface of said membrane.

23. The filtration system of claim 1 wherein the pressure recovery is great enough to enable manual operation of the system.

24. The filtration system of claim 23 wherein the pressure recovery is about fifty percent.

25. A method of filtering a substance comprising the steps of:
    pumping the substance with a first piston, wherein the first piston separates a feed chamber and a retentate chamber;
    passing the substance through at least one membrane filtration element, thereby separating the substance into permeate and retentate; and
    discharging the retentate using a differential pressure activated (DPA) valve, the DPA valve disposed downstream of the membrane filtration element and the retentate chamber with respect to a flow of the retentate, the DPA valve comprising:
        a single housing comprising a port in fluid connection with an inlet to said filtration element, an inlet port for receiving retentate from said filtration element, and a retentate discharge port; and
        a single second piston slideably disposed within said single housing, said second piston positively sealing said inlet port when a feed pressure on a first face of said second piston exceeds a retentate pressure on a second face of said second piston.

26. The method of claim 25 wherein the passing step comprises passing the substance through a reverse osmosis filtration element.

27. The method of claim 25 wherein the discharging step comprises operating the DPA valve hydraulically.

28. The method of claim 25 wherein the discharging step comprising operating the DPA valve according to the relative pressure in the feed chamber and the retentate chamber.

29. The method of claim 28 wherein the discharging step comprising operating the DPA valve automatically as the substance is pumped.

30. The method of claim 25 wherein the pumping step comprises utilizing a pressure difference between the feed chamber and the retentate chamber acting on said first piston to reduce the force necessary to pump the substance.

* * * * *